United States Patent Office 3,502,272
Patented Mar. 24, 1970

3,502,272
COMPACTING METHOD FOR FINELY GRAINED POTASSIUM SULPHATE INTO SHELLS AND COMMINUTING OF THE LATTER
Hans Kellerwessel, Porz-Eil, and Claus Kreutzberg, Surth, near Cologne, Germany, assignors to Klockner-Humboldt-Deutz Aktiengesellschaft, Cologne-Deutz, Germany, a corporation of Germany
No Drawing. Filed Sept. 15, 1967, Ser. No. 668,222
Claims priority, application Germany, Nov. 16, 1966, K 60,726
Int. Cl. B02c 9/00
U.S. Cl. 241—25                                    4 Claims

ABSTRACT OF THE DISCLOSURE

Finely grained potassium sulphate having a water content between approximately .5 and 2.5% is compacted into shells and the latter are then comminuted.

---

The invention relates to a method for compacting finely grained potassium sulphate into shells or plates in a smooth rolling mill and comminuting the same.

In accordance with a known method, potassium fertilizer salts, that is, potassium chloride was compressed with smoothing roller mills to so-called shells, and the latter subsequently comminuted to the desired granulated grain size. The compression of the potassium chloride takes place in this known method either in a dry state, i.e., in which the water content is below approximately 0.3% or in a wet state, i.e., in which the water content is preferably 4 to 6%. It was found that a compression of potassium chloride having a water content of below 0.3% may take place at very high compression pressures and that in this manner very compacted and hard shells can be produced. However, a wet compression of potassium chloride having a water content of approximately 0.5%, owing to the low static friction between the material and the rolls, can only take place at low pressures. The density and strength of the shells produced from wet salts are therefore substantially less than those of the dry shells produced with high specific pressures. For the purpose of producing shells and granules of high resistance or strength, the start must be made therefore with dry salts.

Surprisingly, it was found that potassium sulphate may be compressed at high compression pressure to form shells if it is compacted when having a water content between approximately 0.5 and 2.5%. The shells produced in this manner have a very high resistance or strength. Furthermore, upon compression of potassium sulphate having the above indicated water content, a substantial improvement was found in the entry relations of the rolling mill as compared with the compression of dry salt, so that with a sufficiently high compression pressure, such as 7–14 tons per cm. width of the shell to be produced, one may operate with a larger gap width for producing a thicker shell, and accordingly, an appreciable increase is obtained in the rate of production of the rolling mill.

It was found particularly advantageous to compress potassium sulphate having a water content of approximately 0.8 to 1.5%. It was also found of advantage to subject the shells produced to a drying operation before the comminution of the same takes place, as in this manner the strength or resistance of these plates or shells increases still further. Since potassium sulphate becomes warm during the pressing operation, the drying of the plates may take place in simple manner by means storing the shells or plates in air, so that special drying devices are not necessary.

There are no difficulties involved in obtaining potassium sulphate having a predetermined water content, because the potassium sulphate, after leaving the potassium processing plant, as a rule has a high water content and must subsequently be dried. It is accordingly sufficient to select the drying temperature and time period of drying so that the potassium sulphate is not completely dried but, when leaving the dryer, has still a certain water content with which it is conveyed to the roller mill.

EMBODIMENT BY WAY OF EXAMPLE

A smooth rolling mill with two rolls each having a diameter of 800 mm. was supplied with practically dry potassium sulphate having a specific weight of 2.5 grams per cubic centimeter and a low moisture content of below 0.5%. It was discovered that the capacity of the rolling mill was relatively low, because plates or shells with sufficient strength or resistance could be produced at a density or weight per unit of volume of 2.450 grams per cubic centimeter solely with a maximum thickness of approximately 4.2 mm. However, after the water content of the potassium sulphate was increased to approximately 1.5%, the compression pressure of the roller mill could be increased to ten tons per centimeter width of the shells and thereby the thickness of the plates produced was increased to 7 millimeters. The plates also possessed a density or volumetric weight of 2.475 grams per cubic centimeter. In spite of the increased water content in the potassium sulphate and a greater gap width in the rolling mill these shells revealed a higher strength than the shells produced from the dry material. The shells were subsequently dried for a period of about two hours in atmospheric air, whereby the strength increased still further, and then the shells were conveyed into an impact crusher for comminution. The proportion of the comminuted material ranging in size from 0.5 to 3 millimeters amounted to 76.9% of the output of the impact crusher.

What we claim is:
1. In a method in which fine-grained potassium sulphate is compacted into shells which subsequently are comminuted, the step of treating the potassium sulphate before it is compacted in such a manner that it assumes a water content of approximately 0.5 to 2.5%.
2. A method according to claim 1, including the step of drying potassium sulphate having a water content of above 2.5% until its water content has been decreased to 0.8 to 1.5% and then compacting said dried potassium sulphate into shells.
3. A method according to claim 1, including the step of drying the shells formed of said compacted potassium sulphate by storing it in atmospheric air to increase the strength of said shells, and then comminuting said shells.
4. A method according to claim 1, including the step of drying the shells formed of said compacted potassium sulphate by storing it in atmospheric air to increase the strength of said shells, and then comminuting said shells in such a manner that at least 75% of the comminuted material has a particle size from 0.5 to 3.0 millimeters.

References Cited
FOREIGN PATENTS
886,751   7/1949   Germany.

GERALD A. DOST, Primary Examiner

U.S. Cl. X.R.
241—23